United States Patent [19]

Watanabe et al.

[11] Patent Number: 4,756,398
[45] Date of Patent: Jul. 12, 1988

[54] PASSENGER CONVEYOR APPARATUS

[75] Inventors: Eiki Watanabe; Shigeo Matsueda; Shigeharu Kitamura, all of Inazawa, Japan

[73] Assignee: Mitsubishi Denki Kabushiki Kaisha, Japan

[21] Appl. No.: 854,564

[22] Filed: Apr. 22, 1986

[30] Foreign Application Priority Data

Apr. 23, 1985 [JP] Japan .................................. 60-86956
Jun. 21, 1985 [JP] Japan .................................. 60-135368
Jun. 21, 1985 [JP] Japan .................................. 60-135369

[51] Int. Cl.$^4$ ............................................... B66B 9/12
[52] U.S. Cl. .................................... 198/324; 198/333
[58] Field of Search ................ 198/323, 324, 326, 333

[56] References Cited

U.S. PATENT DOCUMENTS 4,004,676 1/1977 Kraft .................................. 198/326

FOREIGN PATENT DOCUMENTS 47-10294 10/1972 Japan .
48-8877 3/1973 Japan .
0039274 3/1977 Japan .................................. 198/324
0061086 5/1977 Japan .................................. 198/324
0061089 5/1977 Japan .................................. 198/324

Primary Examiner—Robert J. Spar
Assistant Examiner—Lyle K. Kimms
Attorney, Agent, or Firm—Leydig, Voit & Mayer

[57] ABSTRACT

A passenger conveyor apparatus comprises a plurality of steps endlessly connected to each other and guided along a circulating conveyor path, each of the steps having a tread on which a passenger stands and a riser adjacent the forward edge of the tread, at least a portion of the riser of the steps being constituted by a light transmissive material, and a light source for throwing light on the light transmissive material of the riser, the light source being disposed inside the circulating conveyor path.

4 Claims, 4 Drawing Sheets

PASSENGER CONVEYOR APPARATUS

BACKGROUND OF THE INVENTION

The present invention relates to a passenger conveyor apparatus such as an escalator.

As shown in FIGS. 1 and 2, in a conventional passenger conveyor apparatus such as an escalator, a circulating conveyor path 2 is disposed in a main frame 1 of the escalator and has an upper load run 2a on the upper side of the main frame 1, a lower return run 2b on the lower side of the main frame 1 and upper and lower turning portions 2c between the load and return runs 2a and 2b. A plurality of steps 3 are endlessly connected to each other by a step chain 4 and are guided by the step chain 4 along the circulating path 2 by a drive unit 5 disposed in the main frame 1. Each of the steps 3 comprises a tread 3a on which a passenger stands and a riser 3b adjacent the tread 3a. Balustrades 6 are vertically disposed on the main frame 1 and on both sides of the steps 3. Movable handrails 7 are supported by the balustrades 6 thereon and are driven in synchronization with the steps 3. A light source 8 such as a fluorescent lamp is disposed in the upper portion of each of the balustrades 6 below the handrails 7 and illuminates the steps 3 through transparent panels 6a forming the balustrades 6.

In the passenger conveyor apparatus mentioned above, as disclosed in Japanese Utility Model Publication No. 48-8877, the tread 3a in a step 3 is formed by a die casting of light alloy and the riser 3b is made of synthetic resin so as to improve the design of the conveyor apparatus.

However, in such a conventional passenger conveyor apparatus, although the colors and materials of the tread and the riser of a step may be different from each other and there are various color changes of the riser, the design of the conveyor apparatus is still monotonous and a further improvement of the design has been desired. Furthermore, since the size of the portions of the balustrades below the movable handrails in which light sources are usually mounted has recently been reduced, it is difficult to dispose a light source such as an illuminating device within balustrades.

Furthermore, the conventional conveyor apparatus has disadvantages in that there is no means for definitely confirming visually whether the steps are moving up or down, and there is no means for displaying warnings, advertisements, etc.

SUMMARY OF THE INVENTION

To overcome the problems mentioned above, an object of the present invention is to provide a passenger conveyor apparatus in which the design of the conveyor apparatus may be improved and the steps can be illuminated even when the size of a balustrade below the movable handrail is too small to install the light source therein.

Another object of the present invention is to provide a passenger conveyor apparatus in which the direction of the movement of the steps, warnings, advertisements, etc. can be displayed in the riser of a step.

To accomplish the above objectives, the present invention provides a passenger conveyor apparatus comprising a plurality of steps endlessly connected to each other and guided along a circulating path, each of said steps having a tread on which a passenger stands and a riser adjacent the forward edge of said tread, at least a portion of said riser being provided with a light transmissive material, and a light source for transmitting light through the light transmissive material of said riser, said light source being positioned inside the circulating path.

BRIEF DESCRIPTION OF THE DRAWINGS

The present invention will be now described with reference to the preferred embodiments thereof in conjunction with the drawings in which.

DETAILED DESCRIPTION OF THE PREFERRED EMBODIMENTS

Figure 1:
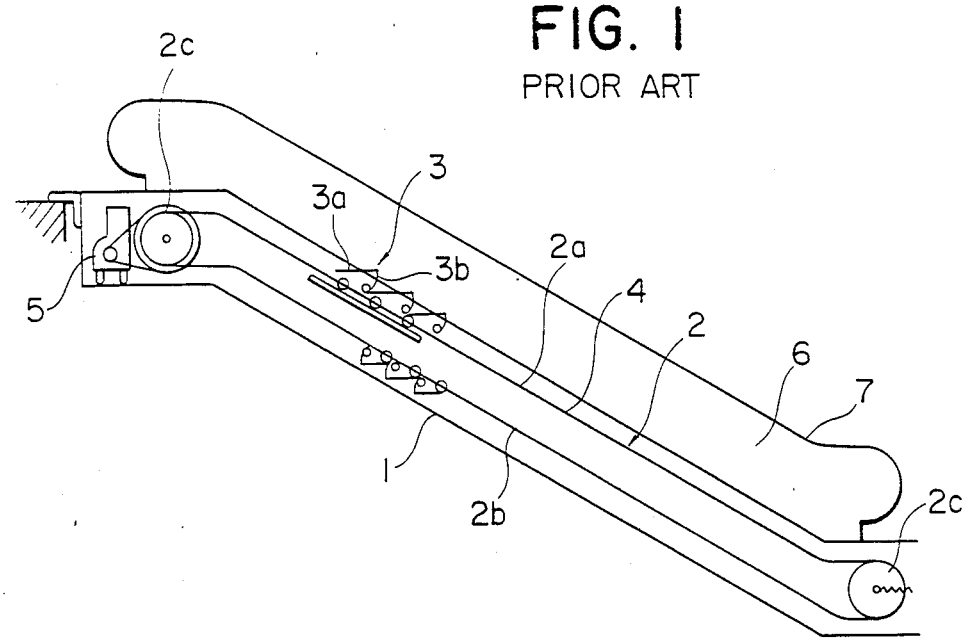
FIG. 1 is a schematic side sectional view showing a conventional passenger conveyor apparatus.
Figure 2:
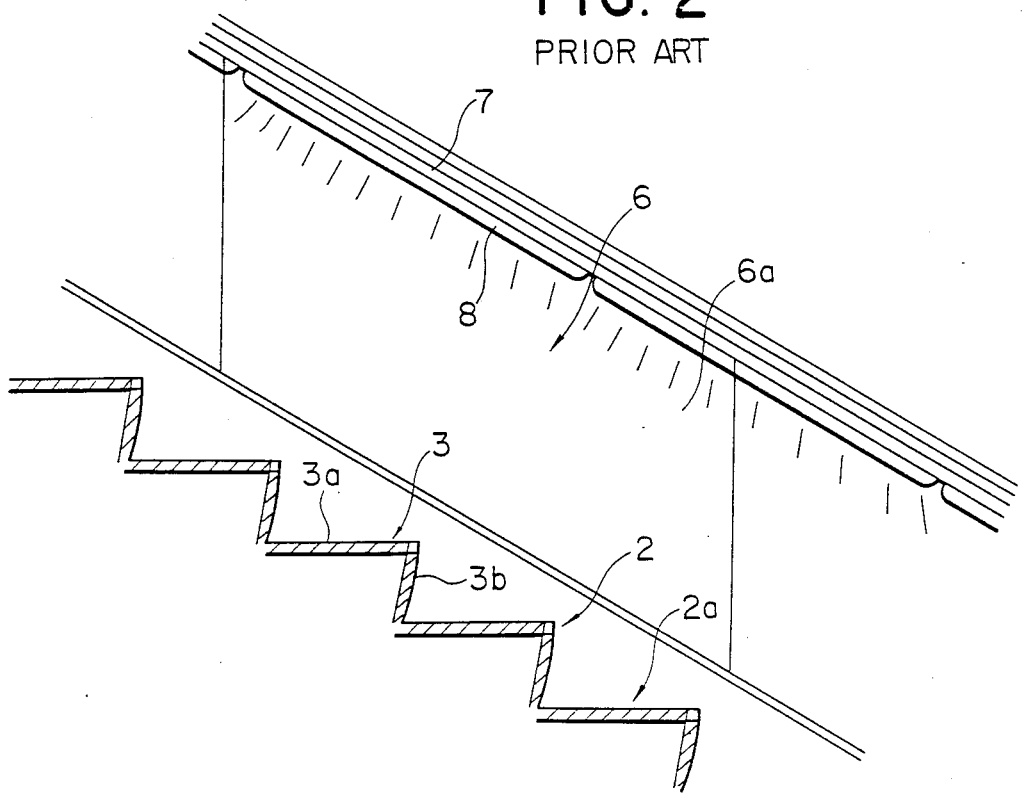
FIG. 2 is a partially enlarged side sectional view of steps and a balustrade of FIG. 1.
Figure 3:
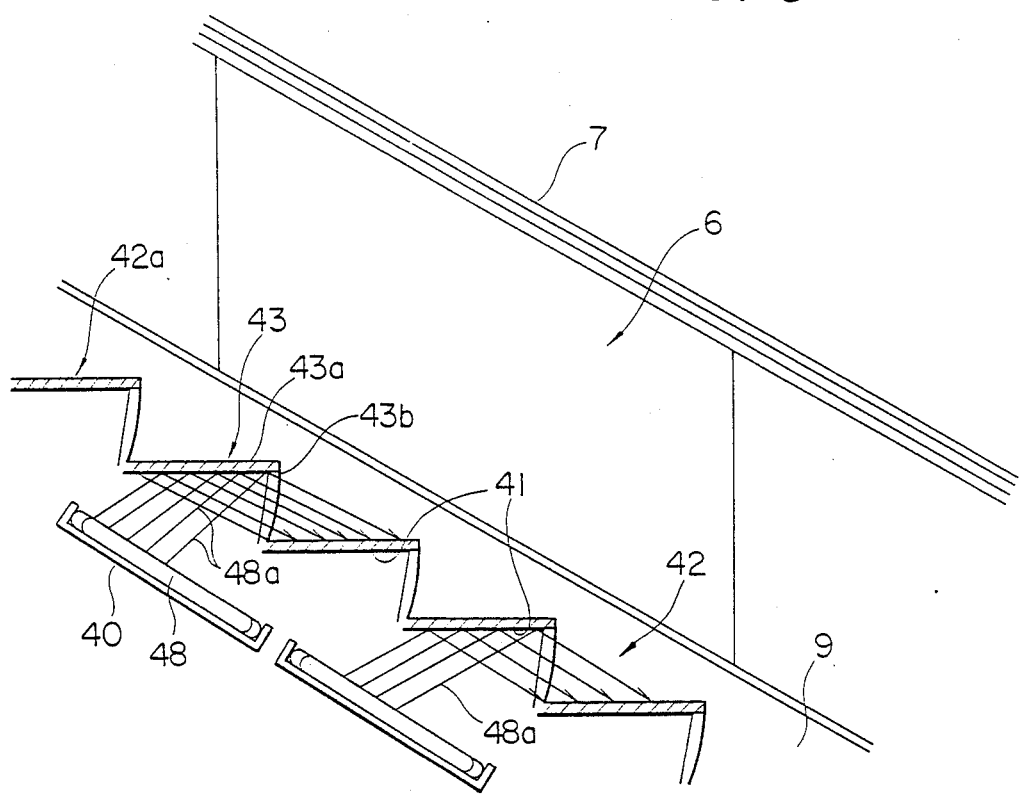
FIG. 3 is a side sectional view showing a main portion of a passenger conveyor apparatus in a first embodiment of the present invention.

Referring to FIG. 3, which shows a main portion of the passenger conveyor apparatus according to a first embodiment of the invention, a pair of balustrades 6 are vertically disposed on both sides of a plurality of movable steps 43 and on an unillustrated main frame of the conveyor apparatus, and a handrail 7 is movably disposed on each of the balustrades 6. Similarly to the conventional conveyor apparatus, the circulating conveyor path 42 comprises a load run, a return run and turning portions therebetween. Numeral 42a denotes the load run of the conveyor path 42. Each of the steps 43 has a tread 43a on which a passenger stands and a curved riser 43b adjacent the forward edge of the tread 43a and extending downwards. The whole riser 43b in each step is preferably constituted of a light transmissive material such as transparent or translucent plastic material. Skirt guards 9 adjacent both side ends of the treads 43a are secured to the main frame of the apparatus. A light source 48 and a hood 40 therefor are positioned inside the loop of the circulating conveyor path 42 and are secured to the main frame of the apparatus. The hood 40 can be used as a reflecting member for transmitting light from the light source 48 onto each riser 43b. A reflecting plate 41 is disposed on the lower surface of the tread 43a of each step 43. The remaining construction is similar to that shown in FIGS. 1 and 2.

In the passenger conveyor apparatus constituted above, when the steps 43 are moved along the load-bearing run 42a of the circulating conveyor path 42, light beams 48a from the light source 48 positioned inside the loop of the circulating conveyor path 42 are reflected by the reflecting plate 41 disposed on the lower surface of the tread 43a of a step and to pass through the riser 43b of the step made of a light transmissive material toward the upper surface of the tread 43a of the forward step, thereby illuminating the steps.

In the first embodiment, by constituting the light transmissive material from a product made of colored transparent synthetic resin, the riser can be arbitrarily colored or made translucent.

Figure 7:
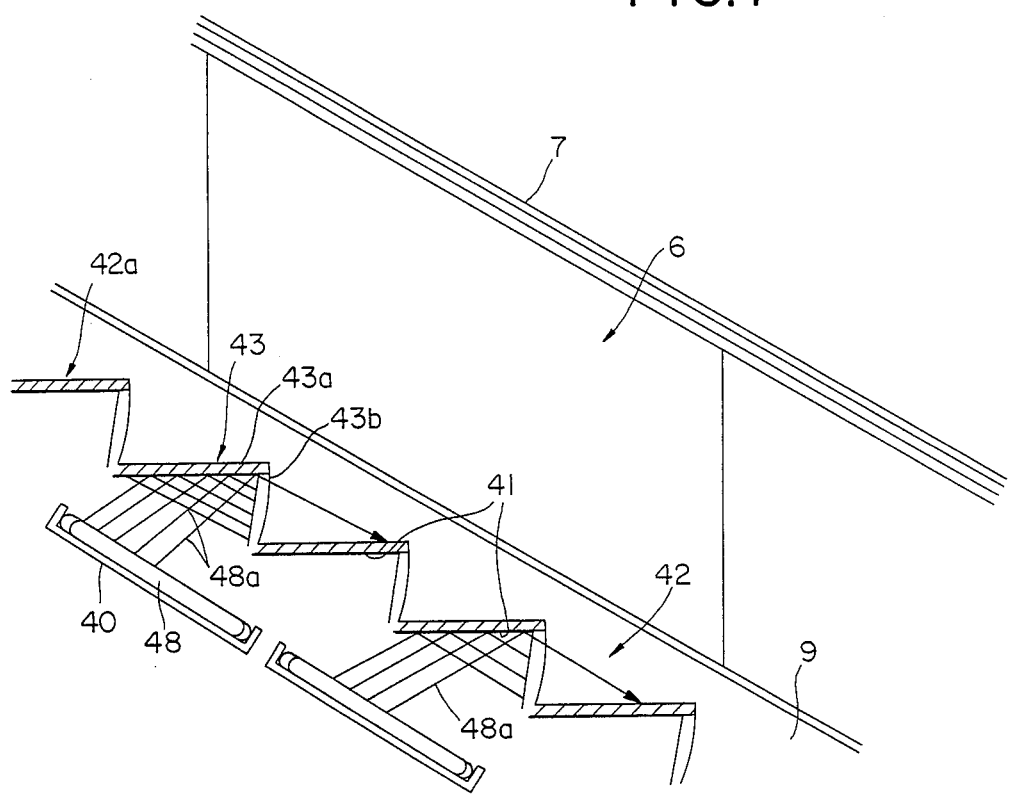
FIG. 7 is a side sectional view showing a main portion of a passenger conveyor apparatus in which an upper end portion of the riser is comprised of light transmissive material.
Figure 8:
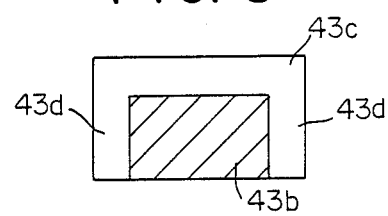
FIG. 8 is a front view of a riser in which the upper end portion and side portions are comprised of light transmissive material.

Furthermore, as shown in FIGS. 7 and 8, at least one of the upper end 43c of the riser 43b adjacent the tread 43a and both side edges 43d of the riser 43b may be formed of the light transmissive material to pass through light transmitted from the light source 48 upwards and, after reflection through the transmissive material, onto the skirt guards 9 or onto the mesh end portions of the steps. Such an arrangement, in comparison with the conventional apparatus in which the peripheral edges of the steps are painted in yellow for safety, can reinforce safety since the steps are illuminated by the light passing through the portion of the riser made of the light transmissive material, which serves as a strong warning to the passengers to be careful about the steps.

As mentioned above, in the first embodiment, at least a portion of the riser in a step is constituted by a light transmissive material and a light source is positioned inside the circulating conveyor path to transmit light through the light transmissive material of the riser. Therefore, the light from the light source which the passengers cannot see, passes through the light transmissive material and illuminates the steps. Furthermore, the light transmissive material can be arbitrarily colored. Accordingly, the design of the apparatus can be improved and the steps can be illuminated without disposing a light source within a balustrade, thereby providing a passenger conveyor apparatus in which the steps can be illuminated even when there is very little space in the balustrade.

Figure 4:
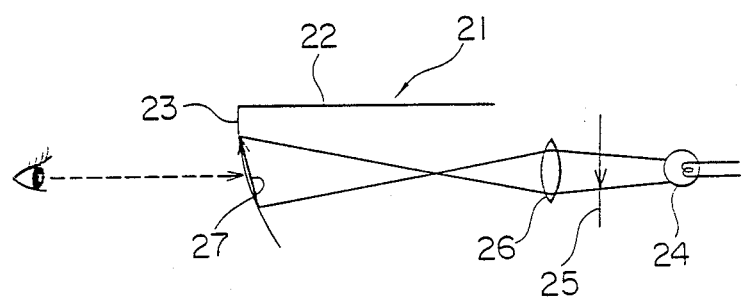
FIG. 4 is a schematic side view of a passenger conveyor apparatus according to a second embodiment of the present invention.
Figure 5:
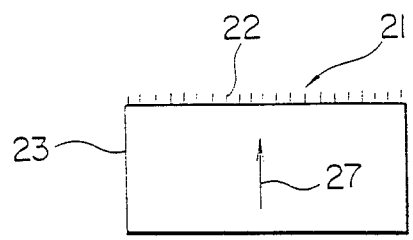
FIG. 5 is a left side view of FIG. 4.

FIGS. 4 and 5 show a second embodiment of the present invention. A step 21 comprises a tread 22 on which a passenger stands and a riser 23 constituted from a translucent plastic. A light source 24 is disposed on the inner side from the riser 23, and a condenser lens 26 and a pattern 25 displaying either of an up or down arrow for example are disposed between the riser 23 and the light source 24. The pattern 25 may be transparent, translucent or opaque. The up and down arrows of the pattern 25 are respectively switched on in accordance with the upward or downward movements of the steps 21. The condenser lens 26 is used to project an image 27 of the pattern 25 on the inside surface of the riser 23. The light source 24, the condenser lens 26 and the pattern 25 constitute a display means for performing a predetermined display. Such a display means is preferably disposed outside the step 21 and may be attached to, for example, the frame of the apparatus.

In the apparatus constituted above, the light from the light source 24 is collected by the condenser lens 26 and the image 27 of the pattern 25 is projected onto the inner surface of the riser 23, thereby displaying the pattern 25 showing either of the up or down arrow on the inner surface of the riser. The passengers can visually recognize the image 27 of the pattern 25 through the translucent riser 25.

The colors of the direction arrows of the image 27 can be changed in accordance with the upward and downward movements of the steps by using transparent patterns of different colors.

In the second embodiment, the image 27 showing either of the up or down arrow is projected onto the inside surface of the riser 23 by the condenser lens 26 and the pattern 25 showing the up and down arrows. However, a pattern displaying one of the up and down arrows may be secured to the inside surface of the riser 23 and may be projected by a light source to display either of the up or down arrow on the outside surface of the light transmissive riser 23.

Furthermore, instead of the up or down arrow, other cautions, warnings, or advertisements may also be displayed on the outside surface of a riser.

In the second embodiment, the riser of a step is constituted by a translucent plastic and a light source throws light on the riser from the inside thereof so that the passengers can visually recognize the display on the outside surface of the riser. Accordingly, when the operational direction of an escalator for example is displayed, the operational direction can be easily recognized from a distance. Furthermore, the contents of the display can be easily changed by changing the illuminating position of the light source or the contents of the pattern.

Figure 6:
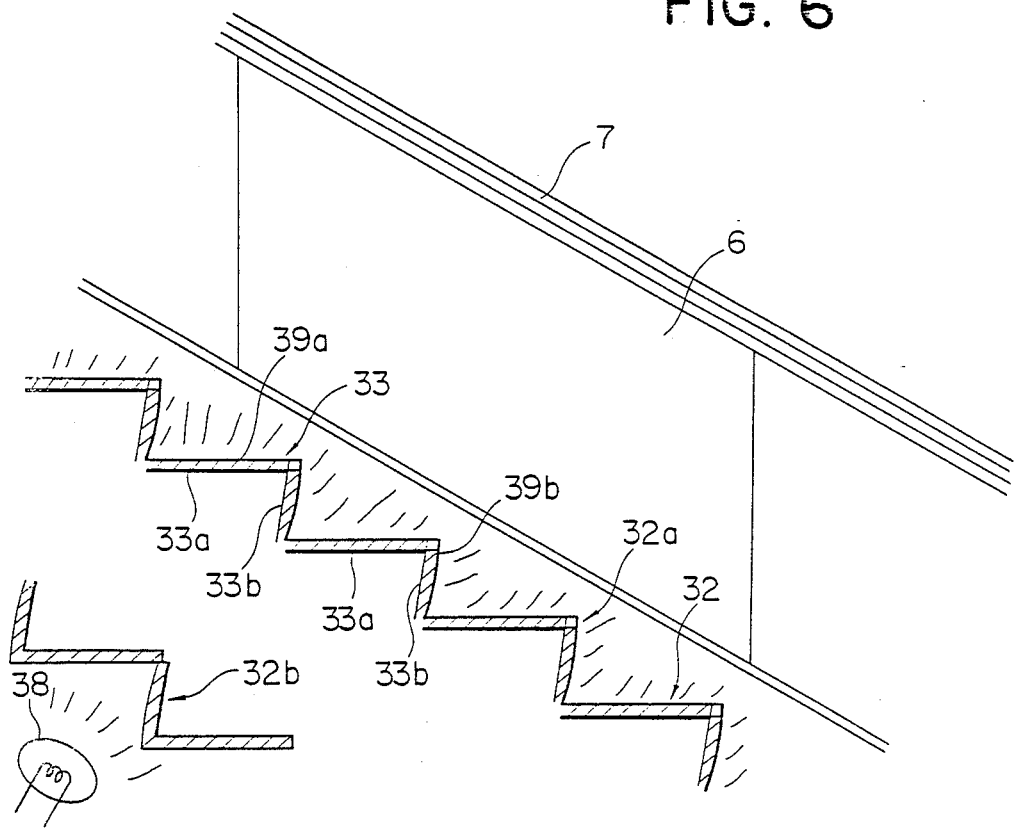
FIG. 6 is a side sectional view of a main portion of a passenger conveyor apparatus according to a third embodiment of the present invention.

FIG. 6 shows a third embodiment of the present invention. In this embodiment, the outer surface 39a and 39b of the tread 33a and the riser 33b in a step 33 are respectively painted with phosphorescent coating materials. A light source 38 for illuminating the steps is disposed below the steps 33 on the return run of a circulating conveyor path 32 and is disposed within an unillustrated main frame of the apparatus. The remaining construction is similar to that shown in FIGS. 1 and 2.

In the passenger conveyor apparatus constructed as above, the phosphorescent surfaces 39a and 39b of the steps 33 moved along the circulating conveyor path 32 are successively illuminated by the light source 38 on the return run 32b of the circulating conveyor path 32. Thus, the outer phosphorescent surfaces 39a and 39b of the tread 33a and the riser 33b emit phosphorescent light when the steps 33 are moved along the load run 32a of the circulating conveyor path 32 through a turning portion thereof so that the entire surface of each step 33 seems to float. Thereafter, these steps 33 are moved to the return run 32b through another turning portion of the circulating conveyor path 32 and the phosphorescent surfaces 39a and 39b thereof are illuminated by the light source 38 again. Accordingly, the phosphorescent surfaces 39a and 39b in the steps 33 are repeatedly illuminated on the return run 32b, maintaining the phosphorescence of the phosphorescent surfaces 39a and 39b to emit light on the load path 32b.

In the third embodiment mentioned above, a suitable reflecting plate may be desirably used to collect and throw the light of the light source 38 onto the phosphorescent surfaces 39a and 39b of the steps 33. Further, the outer surface portion of the tread, the entire riser etc. in each of the steps may be constituted of a material such as a synthetic resin which includes a phosphorescent material, so that the outer surface portions of the steps have phosphorescent surfaces. The phosphorescent surfaces can also be arbitrarily colored by either painting various colors of phosphorescent coating material on their surfaces or forming the surfaces from a material including different colors of the phosphorescent material.

Furthermore, in the third embodiment, the phosphorescent surfaces may be formed only at the peripheral edges of the steps adjacent each other or adjacent the skirt guards. By such a construction, the passengers are vividly alerted about the relative danger of stepping too close to the periphery of the steps by the phosphorescence of the phosphorescent surfaces, improving the safety of the passengers in comparison with the conventional conveyor apparatus in which the demarcation comb and cleats of the steps at the peripheral edges thereof are only painted in yellow for safety.

As mentioned above, in the third embodiment, a phosphorescent portion is formed on an outer surface of each of the steps and a light source for illuminating the phosphorescent surface is disposed on the return run of the circulating conveyor path. Accordingly, the passengers cannot see at the light source on the return run side and the phosphorescent surface is illuminated on the load run side, the phosphorescence of the illuminated phosphorescent surface making the steps seem to float. Furthermore, since the phosphorescent surface can be arbitrarily colored, a passenger conveyor apparatus having greater design appeal can be obtained through a combination of phosphorescence and coloring.

What is claimed is:

1. A passenger conveyor apparatus comprising:
    a plurality of steps endlessly connected to each other and guided along a circulating conveyor path, each of said steps having a tread portion on which a passenger stands and a riser adjacent a forward edge of said tread portion, at least a portion of said riser being comprised of a light transmissive material; and
    a light source means for transmitting light through the light transmissive material of said risers to illuminate the tread portions of said steps, said light source means including a light source positioned inside the circulating conveyor path.

2. A passenger conveyor apparatus as claimed in claim 1 wherein both side ends of each riser are comprised of the light transmissive material to direct light from said light source means toward side edges of each tread portion of said steps.

3. A passenger conveyor apparatus as claimed in claim 1 wherein an upper end portion of each riser is comprised of the light transmissive material to direct light transmitted from said light source means toward the forward edge of each tread portion of said steps.

4. A passenger conveyor apparatus comprising:
    a plurality of steps endlessly connected to each other and guided along a circulating conveyor path, each of said steps having a tread portion on which a passenger stands and a riser adjacent a forward edge of said tread portion, at least a portion of said riser being comprised of a light transmissive material; and
    a light source means for transmitting light through the light transmissive material of said risers to illuminate the tread portions of said steps, said light source means including a light source positioned inside the circulating conveyor path and a reflecting plate disposed on an underside of each tread portion for reflecting light from said light source means through the light transmissive material to illuminate the tread portion of said steps.

* * * * *